Sept. 28, 1926.
W. ASTLE
1,601,592
CONTROL VALVE FOR AIR BRAKE APPARATUS
Filed May 29, 1926    6 Sheets-Sheet 2
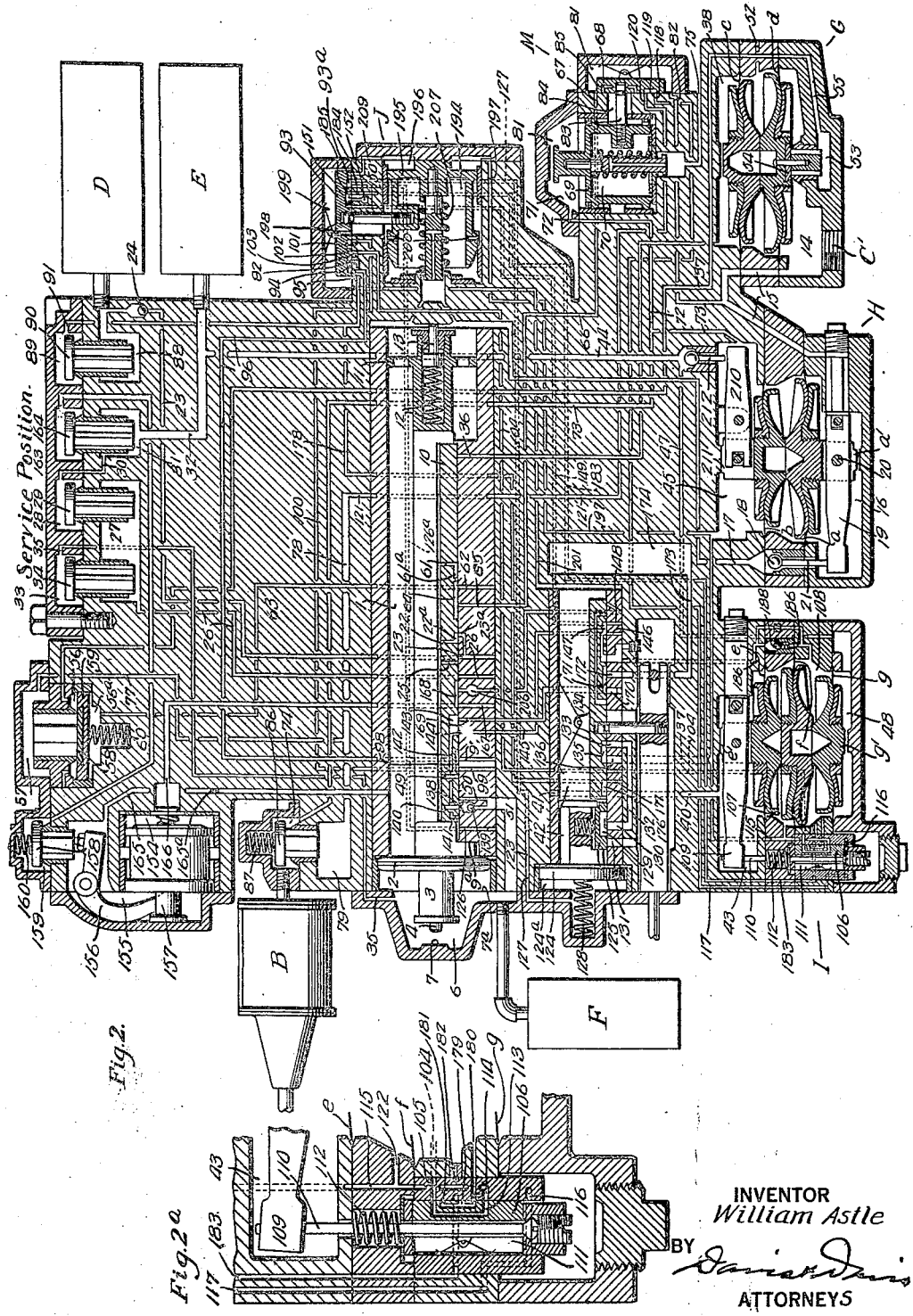
INVENTOR
*William Astle*
BY
ATTORNEYS

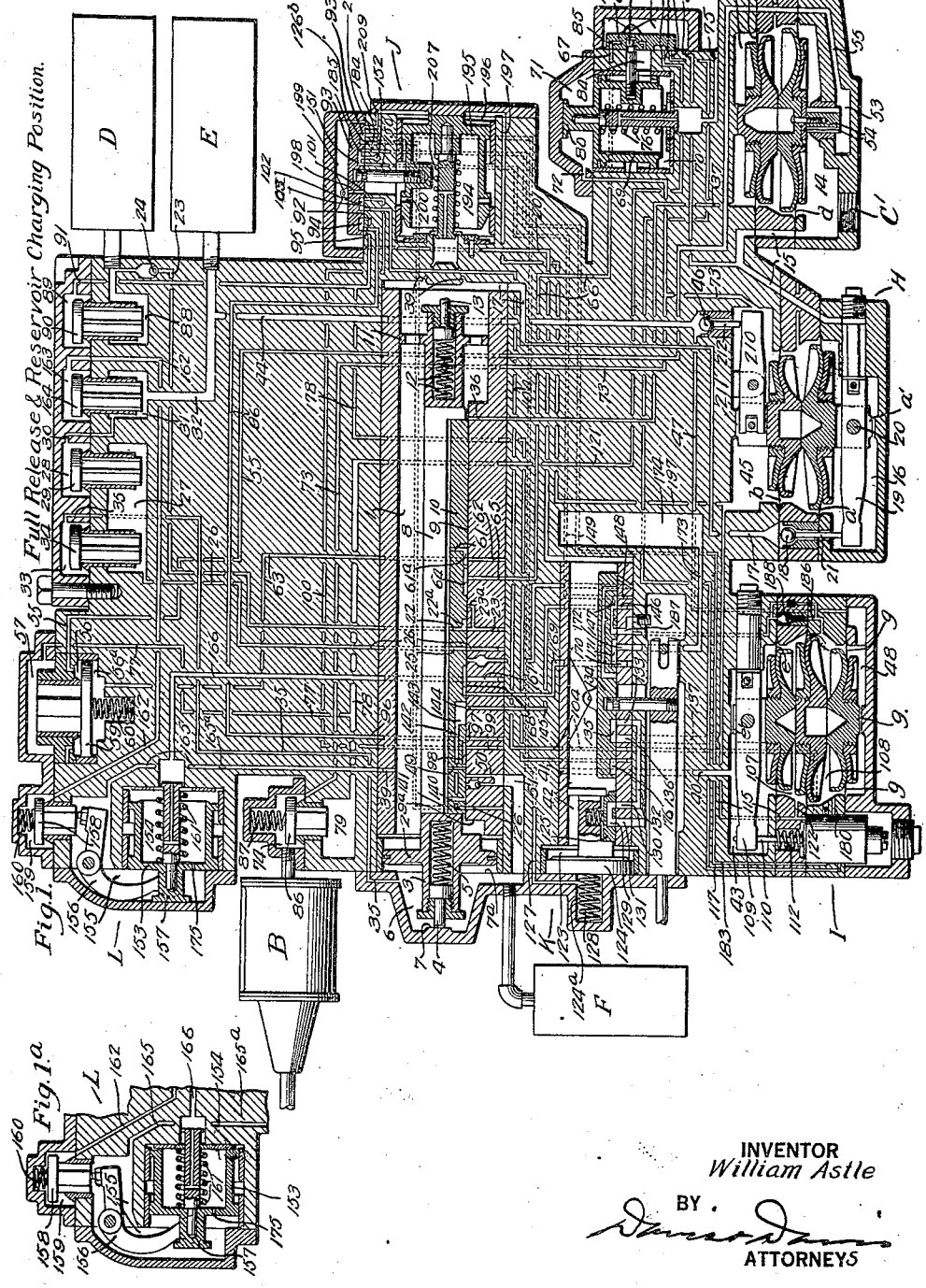

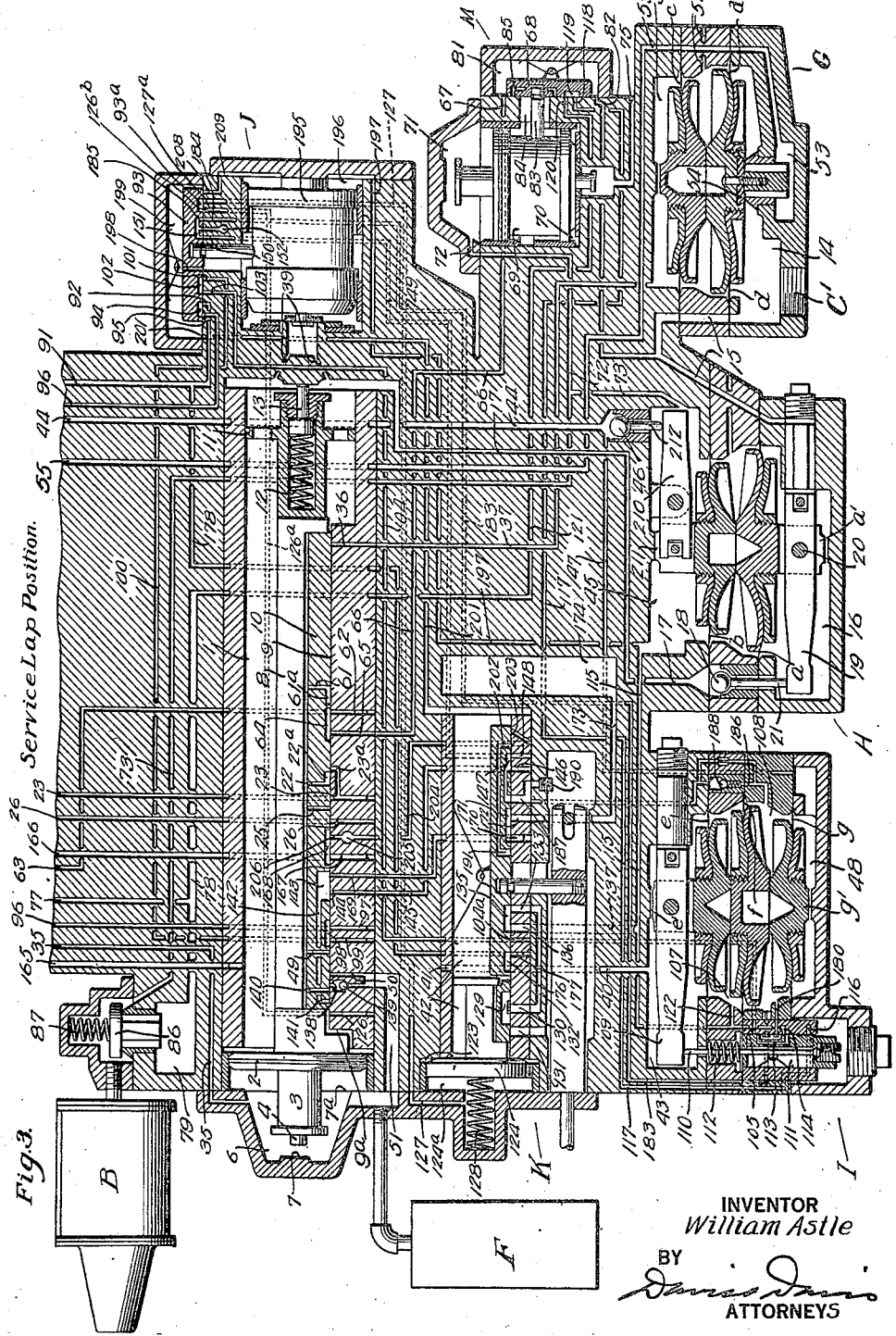

Sept. 28, 1926. 1,601,592
W. ASTLE
CONTROL VALVE FOR AIR BRAKE APPARATUS
Filed May 29, 1926  6 Sheets-Sheet 4
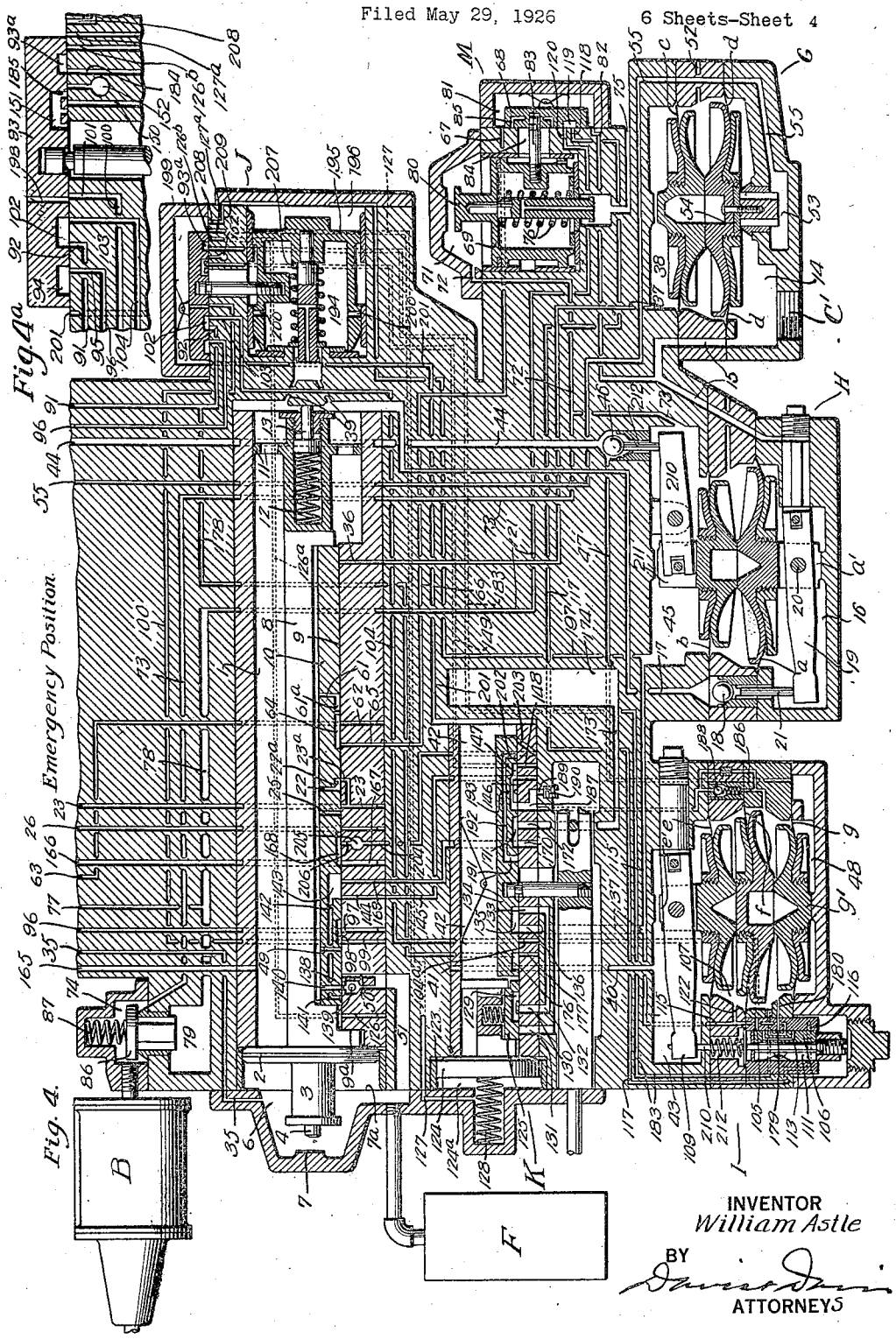
INVENTOR
William Astle
BY
ATTORNEYS

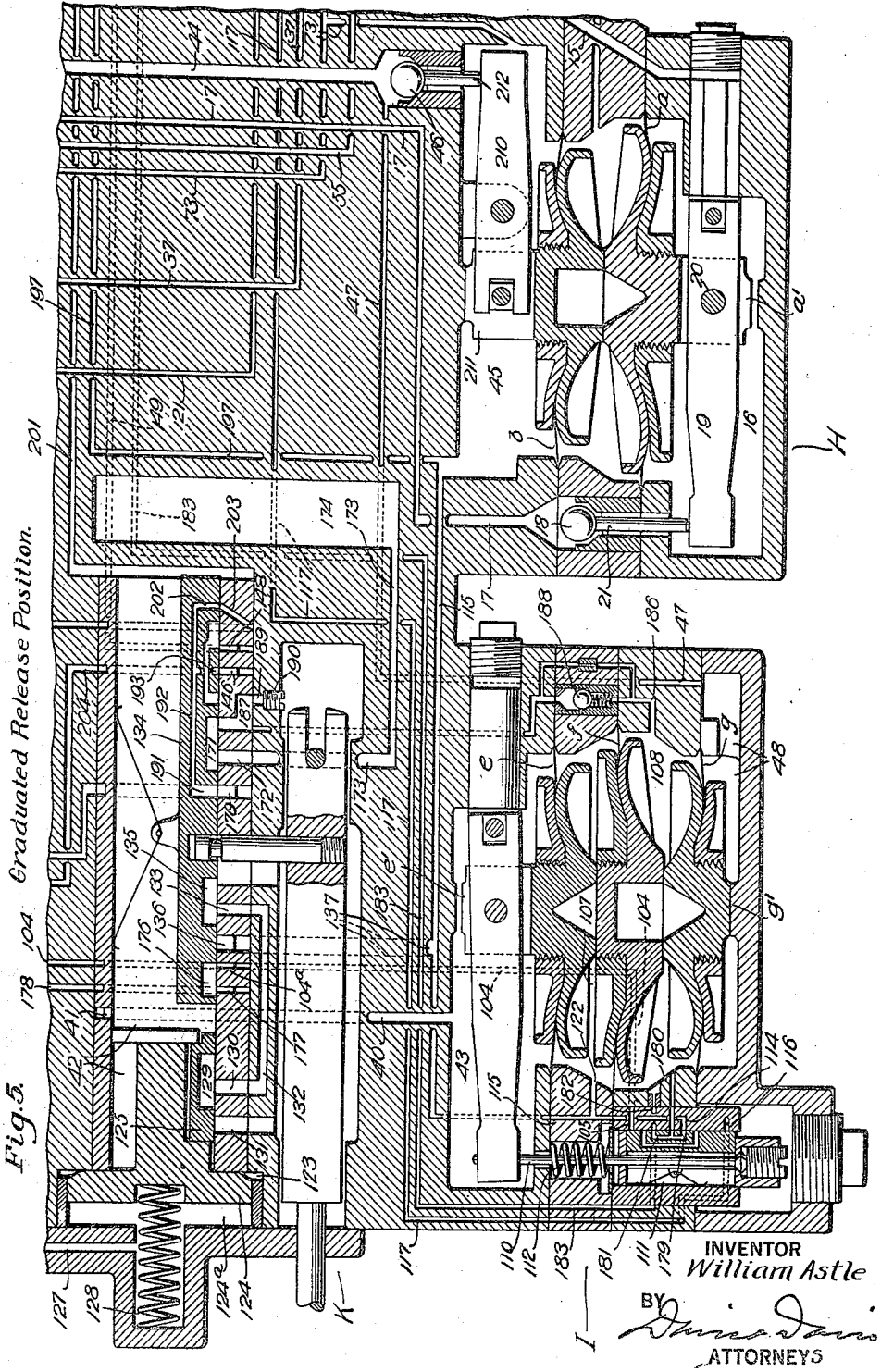
Sept. 28, 1926. W. ASTLE 1,601,592
CONTROL VALVE FOR AIR BRAKE APPARATUS
Filed May 29, 1926 6 Sheets-Sheet 5
Fig.5. Graduated Release Position.
INVENTOR
William Astle
BY
ATTORNEYS

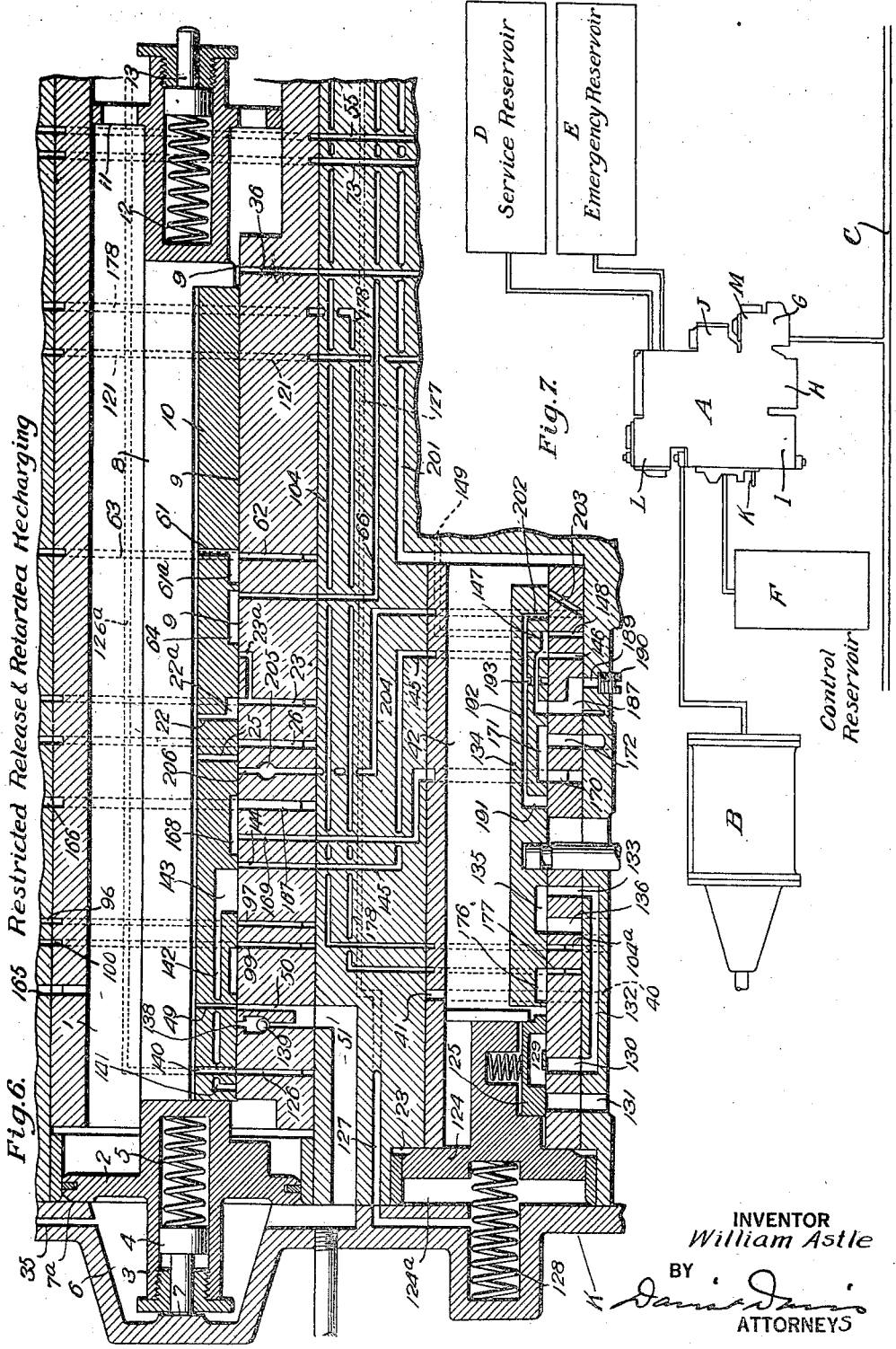

Patented Sept. 28, 1926.

1,601,592

UNITED STATES PATENT OFFICE.

WILLIAM ASTLE, OF BROOKLYN, NEW YORK, ASSIGNOR TO AUTOMATIC STRAIGHT AIR BRAKE COMPANY, OF WILMINGTON, DELAWARE, A CORPORATION OF DELAWARE.

CONTROL VALVE FOR AIR-BRAKE APPARATUS.

Application filed May 29, 1926. Serial No. 112,624.

One of the principal objects of this invention is to provide an air brake apparatus in which there can be no emergency application of the brakes until the brake cylinder pressure is higher than the brake pipe pressure.

Another object of the invention is to provide a control valve, for an air brake apparatus, operating upon a reduction of brake pipe pressure to place a service reservoir in communication with the brake cylinder for a service application of the brakes and wherein an emergency application of the brakes will result from a predetermined relation of the brake pipe pressure to the brake cylinder pressure, an automatically operating emergency valve placing an emergency reservoir in communication with the brake cylinder whenever the required predetermined relation between the brake pipe pressure and the brake cylinder pressure is brought about.

Another object of the invention is to provide a control valve operating upon a reduction of brake pipe pressure to place a service reservoir in communication with the brake cylinder for a service application of the brakes and wherein an emergency valve will operate to connect an emergency reservoir to the brake cylinder when the brake cylinder pressure is higher than brake pipe pressure.

Another important object of the invention is to provide an automatic valve operating upon a reduction of brake pipe pressure to connect the brake pipe to the brake cylinder and to permit a predetermined amount of air to flow from the brake pipe to the brake cylinder.

There are other important objects and advantages of the invention which will appear hereinafter.

In the drawings:

Fig. 1 is a diagrammatic sectional view showing the parts of the control valve in full release and reservoir charging position;

Fig. 1a a detail sectional view of the quick release valve open for a quick release of the brakes;

Fig. 2 a view similar to Fig. 1 showing the parts of the control valve in service application position;

Fig 2a a detail sectional view showing the pilot valve in service position;

Fig. 3 a diagrammatic view of a portion of the control valve mechanism showing the parts in service lap position;

Fig. 4 a view similar to Fig. 3 showing the parts of the control valve in emergency position;

Fig. 4a a detail sectional view showing the equalizing valve in the position which it assumes in emergency applications and also when the brake pipe pressure is slightly below the brake cylinder pressure;

Fig. 5 a diagrammatic sectional view of a portion of the control valve showing the parts in graduated release position;

Fig. 6 a diagrammatic sectional view of a portion of the control valve showing the parts in restricted release and retarded re-charging position; and Fig. 7 a diagrammatic view of the control valve, its associated reservoirs and the brake pipe and the brake cylinder;

In order to simplify the description of the control valve and its operations, the various parts and the ports and passages will not be specifically described except in connection with the description of the various operations of the valve.

In the diagrammatic view, Fig. 7, A designates the control valve; B the brake cylinder; C the brake pipe; D the service reservoir; E the emergency reservoir; and F the control reservoir.

In the control valve is formed a main valve chamber 1. In this chamber is arranged a main actuating piston 2. The piston 2 separates the main valve chamber 1 from the control reservoir chamber 6 to which the control reservoir F is directly connected. The brake pipe is connected to the main valve chamber so that brake pipe pressure is on the inner side of the piston 2 and the control reservoir pressure is on the outer side of said piston. The piston 2 is formed with an outwardly extending tubular extension 3 in which is arranged a spring 5. In the said tubular extension and directly engaging the spring 5 is a normal charging stop 4. The outer end of this spring-pressed stop is adapted to engage a rigid stop 7 to hold the piston 2 and the connected valves in normal charging position. The spring 5 will yield under an excessive brake pipe pressure in chamber 1 and permit the piston and the connected valve to move outwardly to restricted release and retarded re-charging position. The stop 4 is arranged to normally hold the piston 2 slightly inwardly from a stop wall 7ª so that an excessive brake pipe pressure will force the piston 2 outwardly against the tension of the spring 5 until said piston abuts against the rigid stop wall 7ª of the valve casing. This slight excess movement of the piston under an excessive pressure in chamber 1 is for the purpose of cutting off the charging port leading to the emergency reservoir and opening a small port which leads to the control reservoir. The charging port leading to the service reservoir remains open in both the normal charging position and in the retarded charging position of the main slide valve connected to the piston 2. This operation will be fully hereinafter described.

The piston 2 is formed with an inwardly extending valve-engaging portion 8, said inwardly extending portion also serving as a guide for the piston and for the valve connected thereto. On the main valve seat 9 is arranged a main slide valve 10 which is connected to the piston 2 by the inwardly extending part 8. The valve 10 moves with the piston 2. The inward movement of the piston 2 to service application position is positively limited, said piston contacting with the abutment 9ª said abutment being the end of the valve seat.

In the opposite end of the main valve chamber 1 from the piston 2, the guide portion 8 is formed with a guide head or flange 11 which fits within the main valve chamber 1 and serves to maintain the guide portion 8 in its proper relation to the valve 10. The inner or right hand end of the guide portion 8 is tubular and contains a service lap spring 12. This spring yieldingly holds a service stop 13 projecting slightly beyond the inner end of the guide portion 8. The projecting end of this service stop will engage the end of the valve casing when the piston 2 is moved to service position. The spring 12 will yield and permit the valve 10 to be moved into service application position. When the pressures on opposite sides of the piston 2 have equalized, as will be hereinafter described, the service lap spring 12 will move the piston 2 and the valve 10 into service lap position.

The control valve is provided with an automatically operating brake pipe vent valve mechanism G which, upon a reduction of brake pipe pressure, will connect the brake pipe to the brake cylinder and permit air to flow from the brake pipe to the brake cylinder until the brake pipe pressure has been reduced a predetermined amount whereupon the vent valve will close. An automatic emergency valve mechanism H is provided, which, when the brake cylinder pressure exceeds brake pipe pressure by a predetermined amount, opens communication between the emergency reservoir and the brake cylinder for an emergency application of the brakes. A pilot valve mechanism I operates as a service application valve and operates upon a reduction of brake pipe pressure to connect the service reservoir to the brake cylinder for a service application of the brakes. This pilot valve is subject to brake pipe, brake cylinder and emergency reservoir pressures and operates to build up the brake cylinder pressure, on service applications of the brakes at a predetermined ratio to the brake pipe reduction. In graduated release operations the pilot valve will reduce the brake cylinder pressure in direct ratio to the increase in brake pipe pressure. The equalizing valve mechanism J operates upon an equalization of brake cylinder and brake pipe pressures to place the service reservoir in direct communication with the service port of the pilot valve and to connect the brake cylinder chamber of the automatic emergency valve to the actuating chamber of the pilot valve so that the pilot valve will be held in service position and the service reservoir will be held in communication with the brake cylinder. In this position of the apparatus the service reservoir air will be fed into the brake cylinder to compensate for leakage and will hold brake cylinder pressure so long as there is any air remaining in the service reservoir. The manually operable release governing valve K has a quick release position and a graduated release position. In its quick release position it controls the operation of a quick release valve mechanism L and permits a part of the air from the emergency reservoir to flow to the brake pipe for a quick release of the brakes. In its quick release position it also opens a large exhaust port which permits the brake cylinder pressure to have an unrestricted flow to atmosphere in the release position of the main slide valve. The regulating valve mechanism M controls the flow of air from the automatic valve G to the brake cylinder.

*Release and charging.*

In charging the system brake pipe air flows through the brake pipe connection C' into the brake pipe chamber 14 of the automatic brake pipe vent valve G. From this chamber air will flow through passage 15 into the brake pipe chamber 16 of the automatic emergency valve H. From chamber 16 air will flow through passage 17 into the main brake pipe chamber 1. In the passage 17 is arranged a check valve 18 which seats toward the chamber 16. The upper wall of the chamber 16 is formed by a diaphragm *a* and the pressure in said chamber moves said diaphragm upwardly. The diaphragm structure of the automatic emergency valve will be more fully hereinafter described.

Connected to the central supporting structure of the diaphragm $a$ is a depending stop stem $a'$ which is adapted to contact with the lower wall of the chamber 16 to limit the downward movement of the diaphragm $a$. In the chamber 16 is arranged a lever 19, said lever being pivoted at one end on a rigid stud fixed to the wall of the chamber 16. Between its ends it is pivoted at 20 to the stop stem $a'$, the stem being slotted to permit the lever to extend therethrough. The outer free end of the lever 19 engages a pin 21 which extends upwardly into the passage 17 and engages the check valve 18. The pressure in chamber 16 will move the diaphragm $a$ upwardly and thereby cause the lever 19 to unseat valve 18, and to hold it unseated, except as hereinafter described, so that air may pass freely from chamber 16 around the check valve 18 to the main valve chamber 1. The increasing pressure in chamber 1 will move the piston 2 toward the left hand as viewed in the drawings until the normal charging stop 4 engages the rigid stop 7. This will place the main slide valve 10 in release and charging position. From chamber 1 air will pass through port 22 of the main slide valve into port and passage 23, said passage leading to the service reservoir D. In the passage 23 is arranged a check valve 24 which seats toward the port in the seat of the main slide valve so that air cannot flow from the service reservoir back through passage 23 to the seat of the main slide valve. Air will also flow from the main valve chamber 1 through port 25 of the main slide valve into port and passage 26, the said passage leading into a small chamber 27. Connected to the chamber 27 is a small chamber 28 and in said chamber is arranged a check valve 29 which seats toward the chamber 27 and controls communication between said chambers. Air flowing into chamber 27 will unseat the valve 29 and flow into chamber 28. Chamber 28 is connected by a passage 30 to a small chamber 31 and said chamber is connected by passage 32 to the emergency reservoir E. Connected to the chamber 27 is another small chamber 33 and in said chamber is arranged a check valve 34 which seats toward the chamber 27 and controls communication between chamber 33 and said chamber 27. Air flowing into chamber 27 will unseat check valve 34 and flow into chamber 33. Chamber 33 is connected by a passage 35 to the chamber 6 and said chamber is connected directly to the control reservoir F so that chamber 6 and the control reservoir will be charged from chamber 27.

When the main slide valve 10 is in release position, port 36 in the main slide valve seat is uncovered, and said port is connected by passage 37 to the supplementary brake pipe chamber 38 of the automatic vent valve G. The construction and operation of this vent valve will be fully described in connection with the service operation of the control valve. The main slide valve chamber is connected by ports 39 to the brake pipe chamber 194 of the equalizing valve mechanism. In this chamber is arranged the equalizing piston 195. The closed outer end of this piston separates chamber 194 from the brake cylinder chamber 196, this latter chamber being connected by passage 197 to the brake cylinder chamber 45 of the automatic emergency valve. The equalizing valve 93 is connected by a suitable stem to the piston 195, said stem extending through a suitable operating slot in the wall of the valve casing. The equalizing valve is formed with a port 198 which, in the normal position of the equalizing valve, connects the equalizing valve chamber 199 to the operating slot and said slot is in connection with the chamber 194. The equalizing piston is formed with ports 200 which place the chamber 194 in communication with the operating slot when the said piston is in its normal position. The equalizing valve chamber 199 is connected by a passage 201 to the release governing valve chamber 42. In the charging operation air will flow from the main valve chamber through ports 39 into chamber 194 and thence through ports 200 and port 198 into the equalizing valve chamber. From this chamber air will flow from passage 201 into the release governing valve chamber. The release governing valve chamber is connected through port 41 and passage 40 to the actuating chamber 43 of the pilot valve structure so that main valve chamber pressure will be present in chambers 42 and 43. Connected to the emergency reservoir passage 32 is a passage 44 which leads to the brake cylinder chamber 45 of the automatic emergency valve. In this passage is arranged a check valve 46 which seats toward the chamber 45 and prevents emergency reservoir air flowing into said chamber except in emergency operations of the emergency valve, as will be fully hereinafter described. Passage 44 is connected by a passage 47 to the emergency reservoir chamber 48 of the pilot valve structure so that emergency reservoir pressure will always be present in said chamber 48.

With an excessive brake pipe pressure in chamber 1 the piston 2 will be forced to the left, compressing the normal charging spring 5 until the piston 2 engages the rigid stop wall 7ª. This will cause a movement of the slide valve 10 toward the left and move the charging port 25 out of register with the port 26, thereby preventing the flow of air to the chamber 27 and to the emergency reservoir and to the control reservoir. The port 22 is provided with an extension 22ª so that it will remain in communication with port 23 when the port 25 is out of register with port 26. This will permit the brake pipe air to flow to the service reservoir during the period of excess pressure in the main valve chamber 1. The excess movement of the slide valve toward the left, just described, will bring port 49 in the main slide valve into register with a port 50 in the main slide valve seat and said port 50 leads into a large cavity 51 which is directly connected to the chamber 6 and to the control reservoir, so that in the restricted charging position of the main slide valve the control reservoir and the service reservoir will be charged but the emergency reservoir will be cut off from the main valve chamber and will not be charged during the period of excessive pressure in the main valve chamber. Port 49 is a restricted port so that the control reservoir will be slowly charged during the period of excessive pressure in the main valve chamber.

*Service application.*

A service application of the brakes is brought about by a service reduction of brake pipe pressure in the usual manner. A service reduction of brake pipe pressure in chamber 14 will result in a corresponding reduction of pressure in the brake pipe chamber 1 which will result in a movement of the piston 2 inwardly, or toward the right as viewed in the drawings, because of the undisturbed reservoir pressure in chamber 6 and on the outer or left hand face of the piston 2. The piston 2 and the slide valve 10 connected thereto will move inwardly until the stop 13 engages the inner wall of the chamber 1. The service lap spring 12 will be compressed until the piston 2 engages the fixed stop $9^a$. This movement places the main valve in service application position.

The brake pipe vent valve G first operates to connect the brake pipe to the brake cylinder for the purpose of securing a quick but limited drop in brake pipe pressure. This vent valve comprises a pair of diaphragms $c$ and $d$ which are arranged parallel with each other and spaced apart. The outer margins of these diaphragms are suitably secured in the valve casing and the central parts thereof are secured to suitable annular supporting structures which abut so that the two diaphragms move up and down together. The diaphragm $c$ forms the lower wall of the supplemental brake pipe chamber 38 and the diaphragm $d$ forms the upper wall of the brake pipe chamber 14. The diaphragm $c$ is slightly smaller in diameter than the diaphragm $d$ so that the pressure in chamber 14 will hold the diaphragms in their upper position until the pressure in chamber 14 has been reduced a predetermined amount below the pressure in chamber 38. The chamber between the diaphragms is open to atmosphere through the port 52. As hereinbefore pointed out chamber 38 is connected to the main valve chamber through passage 37 and port 36 in the main slide valve seat. Below the chamber 14 is formed a small chamber 53 which is connected to the chamber 14. The diaphragm $d$ carries a valve 54 which is adapted to close communication between chambers 14 and 53. When the pressure in chamber 14 is reduced the predetermined amount below the pressure in chamber 38, the diaphragms will be moved downwardly and valve 54 will close communication between chambers 14 and 53. Chamber 53 is connected by a passage 55 to a chamber 56 and this chamber is directly connected to a small chamber 57. An intercepting valve 58 carried by a piston 59 controls communication between the chamber 56 and the chamber 57. The piston 59 separates chamber 56 from a chamber $56^a$, this latter chamber being below the piston and the chamber 56 being above the piston. A spring 60 normally holds the valve 58 seated to close communication between the chambers 56 and 57. With the system charged valve 54 is held open so that brake pipe pressure flows through passage 55 to chamber 56.

In the release position of the main slide valve a port 61 in said valve registers with a port 62 in the main slide valve seat. Port 62 is connected by a passage 63 to the chamber $56^a$ below the piston 59 so that in the release position of the main slide valve pressure will be equalized on opposite sides of the piston 59 and the valve 58 will be held closed by the spring 60. Port 61 is provided with a foot $61^a$ so that port 61 will remain in register with port 62 with the main slide valve in retarded recharging position. This foot will also place the main valve chamber in communication with the port 62 slightly before the main slide valve reaches its full release and charging position. This is to ensure the proper closing of the valve 58 and to make certain that it will be held closed during the charging operation.

When the main slide valve is moved to service position chamber $56^a$ is vented to atmosphere. The main slide valve is provided with a cavity 64 which, in the service position of the main slide valve, connects port 62 to a port 65 in the main slide valve seat. Port 65 is connected by a passage 66 to a port 67 in the seat of the regulating valve. The regulating valve mechanism M controls the opening and closing of the valve 58. The valve 68 in its normal position connects port 67 to atmosphere, as hereinafter described.

The regulating valve mechanism M comprises a plunger 69 which is arranged to reciprocate in a chamber 70. The upper end of the plunger 69 is closed to form a piston which separates the chamber 70 from a brake cylinder chamber 71, this latter chamber being connected by a passage 72 to a passage 73 leading into the brake cylinder chamber 45 of the automatic emergency valve. Passage 73 also leads to a small chamber 74 which is directly connected to the brake cylinder B. Brake cylinder pressure will always be present in chamber 71. Chamber 70 is open to atmosphere through passage 75. A spring 76 normally holds the plunger 69 in its upper position with its stop stem 80 in engagement with the upper wall of the chamber 71. The regulating valve 68 is mounted in a chamber 81 and said chamber is in open communication through a passage 82 to the brake pipe passage 15 so that the brake pipe pressure will always be present in the valve chamber 81. The regulating valve 68 is connected by a stem 83 to the plunger 69, said stem extending through an operating slot 84 in the wall of the chamber 70. In the normal position of the valve 68 a port and passage 85 connects port 67 to the operating slot 84 and through said slot to chamber 70. Chamber 70 is normally open to atmosphere so that when the main slide valve moves to service position chamber 56ª will be vented to atmosphere and the pressure in chamber 56 will open valve 57. When said valve is open brake pipe air will flow through passage 55 into chamber 56 and thence into chamber 57. Chamber 57 is connected by a passage 77 to a supplemental brake cylinder passage 78 which leads into a small chamber 79. Chamber 79 is connected to chamber 74. In chamber 74 is arranged a check valve 86 which normally seats toward the chamber 79. A spring 87 holds valve 86 yieldingly to its seat. Brake pipe air will therefore flow through from chamber 57 to chamber 79 and past check valve 86 into the brake cylinder.

When the main slide valve moves to service position port 36 is closed and the air in chamber 38 is trapped therein. When the pressure in chamber 14 is reduced a predetermined degree below the pressure in chamber 38 valve 54 will be closed and the flow of brake pipe pressure through passage 55 to chamber 56 will be stopped. The vent valve 54 will permit a quick flow of a predetermined amount of brake pipe air to the brake cylinder. This is for the purpose of securing a quick serial action of the control valves throughout the train.

Brake cylinder pressure will build up in chamber 45, and the corresponding pressure will be built up in chamber 71. As the brake cylinder pressure rises in chamber 71 the plunger 69 will be forced downwardly and the regulating valve will uncover port 67 so that brake pipe pressure may flow from chamber 81 through port 67 and passage 66, port 65, cavity 64 of the main slide valve, port 62 and passage 63 to chamber 56ª and close valve 58.

The service reservoir D is directly connected to a small chamber 88 and said chamber is connected to a small chamber 89. A check valve 90 is arranged in chamber 89 and seats toward the chamber 88, closing communication between the two chambers. The check valve will be unseated by a superior pressure in chamber 88 and thereby permit service reservoir pressure to flow into chamber 89. Chamber 89 is connected by a passage 96 to a port 97 in the seat of the equalizing valve 93. The valve 93 is formed with a cavity 94 which in the normal position of the equalizing valve connects port 92 to a port 95. Port 95 is connected by a passage 96 to a port 97 in the seat of the main slide valve. The main slide valve is formed with a cavity 98 which in the service position of the main slide valve connects port 97 to a port 99. Port 99 is connected by a passage 100 to a port 101 in the seat of the equalizing valve. The equalizing valve is formed with a cavity 102 which in the normal position of the said valve connects port 101 with a port 103. Port 103 is connected by passage 104 to the service port 105 in the seat of the pilot valve 106 so that in the service position of the main slide valve, with the equalizing valve in normal position, service reservoir air may flow to the service port 105 of the pilot valve. The reduction of pressure in chamber 1 results in a corresponding reduction of pressure in chamber 194 of the equalizing valve. Air will flow from the release governing valve chamber 42 through passage 201 to the chamber 199 and thence into chamber 194. The chamber 42 is connected by passage 40 to the actuating chamber 43 of the pilot valve structure so that there will be a reduction in chamber 43 corresponding to the reduction of pressure in the main valve chamber 1. The reduction of pressure in chamber 43 permits the undisturbed emergency reservoir pressure in chamber 48 to move the pilot valve upwardly to service position. (See Fig. 2).

The pilot valve structure comprises three diaphragms, *e*, *f* and *g*. These diaphragms are parallel and horizontally arranged, their marginal edges being suitably secured in the valve casing. The central portions of these diaphragms are supported and clamped between suitable supporting disks and the central hubs of these disks abut each other so that the diaphragms will move up and down together. The diaphragm *e* forms the lower wall of the actuating chamber 43, and may be termed the actuating diaphragm. The diaphragm *e* also forms the upper wall of a brake cylinder pressure equalizing chamber 107. The diaphragm $f$ forms the lower wall of the equalizing chamber and also forms the upper wall of a retention chamber 108. The diaphragm $f$ is larger in area than the actuating diaphragm $e$ and the emergency diaphragm $g$. The emergency diaphragm $g$ forms the upper wall of the emergency chamber 48 and the lower wall of the retention chamber 108. The central support of the actuating diaphragm is formed with an upwardly extending stop stem $e'$ which is adapted to engage the upper wall of the chamber 43 to limit the upward movement of the diaphragms. The central support of the diaphragm $g$ is formed with a depending stop $g'$ which is adapted to engage the lower wall of the chamber 48 to limit the downward movement of the diaphragms. In the actuating chamber 43 is arranged a horizontal lever 109 which is pivoted at one end to a rigid stud, the said lever being pivoted between its ends to the central stop stem $e'$. To the free end of the lever 109 is connected a valve stem 110 which extends down through a valve chamber 111 which is in direct and open communication with the actuating chamber. Connected to the valve stem is a pilot valve 106 so that said valve will be moved up and down on its seat in response to the movement of the diaphragms. When the pilot valve is moved upwardly to service position, as shown in Fig. 2, the service lap spring 112 will be slightly compressed so that said spring will tend to move the pilot valve back to service lap position.

In the service position of the pilot valve a port and passage 113 connects the service port 105 to a port 114 in the seat of the pilot valve. Port 114 is connected by passage 115 to the brake cylinder chamber 45 of the automatic emergency valve. This will permit service reservoir air to flow from port 105 into the chamber 45. As hereinbefore pointed out chamber 45 is connected to the brake cylinder through passage 73 and small chamber 74. Air will therefore flow from chamber 45 to the brake cylinder.

When the pilot valve has been moved upwardly to service position it uncovers port 116 so that brake pipe pressure may flow from the valve chamber 111 into said port. Port 116 is connected by passage 117 to port 118 in the seat of the regulating valve 68. The regulating valve is formed with a cavity 119 which in the operated or lowered position of said valve connects port 118 to a port 120. Port 120 is connected by passage 121 to the supplemental brake cylinder passage 78 so that brake pipe air may flow from the actuating chamber and the valve 111 to the brake cylinder while the pilot valve is in service position and the control valve is in its operated position.

The brake cylinder pressure equalizing chamber 107 of the pilot valve structure is connected by a passage 122 to the brake cylinder passage 115 so that a pressure equal to the brake cylinder pressure will be built up in said chamber 107. The pilot valve will remain in service position until the downward force exerted on the diaphragm $f$ by the pressure in chamber 107 is sufficient with the force exerted on diaphragm $e$ by the pressure in chamber 43 to overcome the undisturbed emergency reservoir pressure in chamber 48. When a balance has been reached between these opposing pressures the spring 112 will move the pilot valve to lap position and thereby stop the flow of service reservoir air and brake pipe air to the brake cylinder.

The release governing valve chamber 42 is formed at one end, the left hand end, as viewed in the drawings, with a piston chamber 123 in which is arranged a piston 124. This piston carries an inwardly extending piston stem and to said stem is connected an exhaust control valve 125. The piston 124 is subject on one side to the brake pipe pressure in the release governing valve chamber 42. On its other side it is subject to the pressure in the chamber $124^a$ on the outer side of said piston. In the release position of the main slide valve chamber $124^a$ is vented to atmosphere, as will be hereinafter described, under the heading "Release after service". In the service position of the main slide valve a port 126 is uncovered and said port is connected by passage $126^a$ to a port $126^b$ in the seat of the equalizing valve 93. Valve 93 is formed with a cavity $93^a$ which in the normal position of said valve connects port $126^b$ with a port $127^a$. Port $127^a$ is connected by passage 127 to the chamber $124^a$. This permits brake pipe pressure to flow from the main valve chamber into the chamber $124^a$, thus balancing the pressures on opposite sides of the piston 124. A spring 128 is arranged in the chamber $124^a$ and normally tends to force the piston 124 and the valve 125 inwardly to close the brake cylinder exhaust port. When the pressures have equalized on opposite sides of the piston 124 the spring 128 will move the exhaust control valve to closed position, and said valve will remain closed until the main slide valve has been moved back to release position. The exhaust control valve 125 is formed with a port and passage 129 which, in the release position of said valve, connects a port 130 to the main brake cylinder exhaust port 131. When the valve 125 is moved inwardly port 131 is closed. Port 130 is connected by passage 132 to a port 133 in the seat of the release governing valve 134. The release governing valve is formed with a cavity 135 which, in the quick release position of said valve, connects port 133 to a port 136, this latter port being connected by passage 137 to the brake cylinder passage 115.

The cavity 51 is connected to a port 138 in the seat of the main slide valve. In said port is arranged a back pressure check valve 139 which seats toward the cavity 51 so that air cannot flow from the main valve chamber through said port into the cavity 51. When the main slide valve is in service position a port 140 registers with port 138. This permits control reservoir pressure to flow into the main valve chamber and to equalize therein. This results in an equalization of pressures on opposite sides of the piston 2 and the service lap spring 12 will move the main slide valve to service lap position. This moves port 140 out of register with port 138. The cavity 98, however, will maintain communication between ports 97 and 99 so that service reservoir pressure will be maintained at the service port 105 of the pilot valve. Should the brake cylinder pressure leak down while the main slide valve is in service lap position the pilot valve will be moved upwardly into service position. This will uncover port 116 and connect port 105 to port 114 so that air may again flow from the service reservoir and the brake pipe to the brake cylinder to compensate for leakage. The brake cylinder pressure will again be built up to the desired degree before the pilot valve will be again moved to lap position.

The equalizing diaphragm f of the pilot valve structure is so proportioned with respect to the actuating diaphragm e and the emergency diaphragm g that the brake cylinder pressure will be in direct ratio to the brake pipe reduction. Preferably this ratio is two-and-one-half to one so that a ten pound brake pipe reduction in the main valve chamber and in the actuating chamber 43 will result in a twenty-five pound brake cylinder pressure in chamber 107 and in chamber 45 before the pilot valve is moved to lap position. This ratio of pressures may be varied as desired by varying the relative proportions of the diaphragm f and the diaphragms e and g. Preferably the diaphragms e and g are of the same effective area.

The brake cylinder pressure in chamber 45, resulting from a service reduction of brake pipe pressure, will have no effect upon the automatic emergency valve because of the superior pressure in the brake pipe chamber 16 so that the valve 18 will remain open and the valve 46 will remain closed in all operations of the control valve except emergency operations, as will be fully hereinafter described under the heading "Automatic emergency application."

The service reservoir charging port 23 is formed with an extension 23ª and said extension is adapted to register with the foot 22ª of the port 22 in the main slide valve when said valve is in service position. This results in a flow of air from the main valve chamber to the service reservoir in the service application position of the main slide valve should the service reservoir be below the brake pipe pressure in chamber 1. The check valve 24 will prevent a back flow of air from the service reservoir to the main valve chamber.

*Release after service—Quick release.*

To adjust the control valve for quick release operations the release governing valve 134 is moved to its outer position, as shown in Fig. 1.

To effect a release of the brakes in a service application the brake pipe pressure must be increased in the usual manner through the manipulation of the engineer's brake valve. The increase brake pipe pressure will flow into chamber 14 of the automatic vent valve and thence through passage 15, chamber 16 of the automatic emergency valve and through passage 17 to the main valve chamber 1. Should the brake pipe vent valve 54 be opened by the increasing brake pipe pressure in chamber 14 it will have no effect because valve 58 will be closed and there will be no flow of air through passage 55. The increase in pressure in chamber 1 will force the piston 2 and the main slide valve to normal release and charging position as shown in Fig. 1. The increased pressure in chamber 1 will flow through ports 39 into the chamber 194 of the equalizing valve. From this chamber air will flow through ports 200, port 198, the equalizing valve chamber 199 and passage 201 into the release governing valve chamber 42. From chamber 42 air will flow through port 41 and thence through passage 40 into the actuating chamber 43 of the pilot valve. The increase in pressure in the actuating chamber 43 will force the diaphragm structure and the pilot valve downwardly to release position, as shown in Fig. 5.

In the release position of the main slide valve a port 141 of the main slide valve registers with port 126. Port 141 is connected by passage 142 to a large cavity 143 in the main slide valve. Cavity 143 registers with a port 144 and said port is connected by passage 145 to port 146 in the seat of the release governing valve. In the release governing valve is formed a cavity 147 which, in the quick release position of said valve, connects port 146 to a port 148. A passage 149 connects port 148 to a port 150 in the seat of the equalizing valve 93. The equalizing valve is formed with a port and passage 151 which, in the normal position of said valve, connects port 150 to an atmospheric port 152. The chamber 124ª will therefore be vented to atmosphere through passage 127, port 127ª, cavity 93ª, port 126ᵇ and passage 126ª to port 126, and the piston 124 and the exhaust control valve 125 will be moved outwardly to release position by the pressure in the release governing valve chamber 42. In the release position of the release governing valve brake cylinder pressure may flow from chamber 74 through passage 73 into chamber 45 of the automatic emergency valve and thence through passages 115 and 137 to cavity 135 of the release governing valve and thence through the connecting ports and passages to the main cylinder exhaust port 131.

The pilot valve in release position will close the service port 105. The brake cylinder passage 115 will be connected through port 114 and ports and passages in the pilot valve to the retention chamber 108 and said chamber is connected by passages and by ports in the equalizing valve 93 to atmosphere thereby giving a secondary exhaust of brake cylinder pressure. In the quick release operations of the control valve this release of brake cylinder pressure through the pilot valve is in addition to the main free exhaust of brake cylinder pressure through the release control valve. In the graduated release operations and in the restricted release operations of the control valve the release of brake cylinder pressure takes place entirely through the pilot valve, and the operation of the pilot valve will be fully described under the head "Release after service—Graduated release".

In the quick release operation a portion of the emergency reservoir air is discharged into the brake pipe for the purpose of quickly raising brake pipe pressure and thereby bringing about a quick serial release of the brakes throughout the train. To effect this discharge of emergency reservoir air to the brake pipe the quick release valve mechanism L is provided. This mechanism comprises a quick release plunger 153 mounted to reciprocate in a chamber 154. The closed head of this plunger separates chamber 154 from a chamber 155. In the chamber 155 is pivoted a quick release lever 156, one arm of which is operatively connected to a stem 157 of the quick release plunger. The other arm of said lever is adapted to engage a quick release valve 158 which is arranged in a small chamber 159; and controls comunication between said chamber and chamber 155. This valve seats toward chamber 155 and is normally held seated by the pressure in chamber 159 and a spring 160. A spring 161 holds the release plunger in normal position with the stem 157 in engagement with the outer wall of the chamber 155. In this position of the plunger the quick release valve 158 is seated and communication between chambers 159 and 155 is closed. Chamber 159 is connected by passage 162 to a small chamber 163 which is connected to chamber 31. A valve 164 is arranged in chamber 162 and seats toward the chamber 31 and prevents the passage of air from 163 to 31 but permits air to flow from the emergency reservoir past said valve into passage 162, so that emergency reservoir air is always in chamber 159 and on top of the valve 158. Chamber 155 is connected by passage 165 to port 39 leading into the main valve chamber 1 so that brake pipe pressure from chamber 1 is always present in chamber 155. Chamber 154 is connected by passage 166 to a port 167 in the seat of the main slide valve.

In the release position of the main slide valve a cavity 168 in said valve connects port 167 to a port and passage 169 which leads to a port 170 in the seat of the release governing valve. The release governing valve is formed with a cavity 171 which, in the quick release position of said valve, connects port 170 with a port 172 and this latter port is connected by passage 173 to a quick release chamber 174. The pressure in chamber 154 will, therefore, be vented into the quick release chamber 174 and the resulting decrease in pressure in chamber 154 will permit the brake pipe pressure in chamber 155 to move the plunger 153 inwardly and thereby open the quick release valve 158. When said valve is open emergency reservoir air will flow into chamber 155 and thence through passage 165 and port 39 into the main valve chamber and thence to the brake pipe through passage 17. Emergency reservoir air will continue to flow into the chamber 1 until there has been an equalization of pressure on opposite sides of the release plunger 153. This equalization takes place through a small leak port 175 in the quick release plunger. When the pressures on opposite sides of the plunger have equalized the spring 161 will move the plunger to normal position and the valve 158 will close. The size of the leak port 175 and the volume of the chamber 174 will govern the period of time during which emergency reservoir air may flow to the brake pipe. In the passage 165 is a restriction plug 165ª which also serves to control the flow of air to the chamber 1.

When the main slide valve is moved to service position cavity 143 therein connects port 169 to port 144. This permits the pressure in quick release chamber 174 to blow down to atmosphere through the connected passages and ports to the atmospheric port 152.

When the brake cylinder pressure has been completely exhausted, or substantially so, the regulating valve piston 69 will be moved upwardly and the regulating valve will be restored to normal position, as shown in Fig. 1.

If, during the release period, there should be an excessive pressure in chamber 1, the piston 2 will be carried over to restricted release and retarded re-charging position, as shown in Fig. 6. In this position the normal stop 4 has been moved inwardly against the pressure of the spring 5 and the port 140 of the main slide valve has been brought into register with port 126. This permits brake pipe pressure from chamber 1 to flow into the chamber 124ª and equalize therein with the pressure on the opposite side of the piston 124. The spring 128 will then move the exhaust control valve inwardly to closed position, thereby preventing the exhaust of brake cylinder pressure through port 131. While the excessive pressure is maintained in the main valve chamber 1 the exhaust of brake cylinder pressure will take place entirely through the pilot valve and the ports and passages of the equalizing valve, as hereinbefore pointed out. The retarded recharging port 49 will be in register with port 50 and the control reservoir will be slowly recharged. When there has been an equalization of pressure on opposite sides of the piston 2 the main slide valve will be moved back to normal charging position and then the release control valve will be moved to its full release position. During the period of excessive brake pipe pressure in chamber 1 the recharging of the reservoirs will take place as hereinbefore described.

*Release after service—Graduated release.*

The control valve is adjusted for graduated release operation by moving inwardly the release governing valve 134, as shown in Fig. 5.

To effect a graduated release of the brakes the brake pipe pressure must be increased, in the usual manner, a predetermined amount and the increased brake pipe pressure must be less than the full running pressure or the full charging pressure. The increase in brake pipe pressure in chamber 1 will move the piston 2 and the main slide valve to release position, as hereinbefore described. The increased pressure in chamber 1 will flow through the charging ports and passages to the reservoir and also from said chamber 1 through ports 39 into the chamber 194 of the equalizing valve and from said chamber to the release governing valve chamber, as hereinbefore described. From the release governing valve chamber 42 air will flow through port 41 and passage 40 into the actuating chamber 43 of the pilot valve structure. The diaphragms will be moved downwardly and the pilot valve will be moved to release position, as hereinbefore described.

In the graduated release position of the release governing valve the port 136 is closed. This renders the exhaust control valve 125 ineffective. The release governing valve is provided with a cavity 176 which, in the graduated release position of said valve, connects a port 104ª with a port 177. Port 104ª is connected to the passage 104 which leads to the service port 105 in the seat of the pilot valve. Port 177 is connected to a passage 178 which leads to the passage 91 connected to the service reservoir D as hereinbefore described so that in the graduated release position of the release governing valve the service reservoir is connected to the passage 104 directly and independently of the main slide valve and also independently of the equalizing valve. This permits the pilot valve, in service position, to connect the service reservoir to the brake cylinder independently of the main slide valve and independently of the equalizing valve.

In the release position of the pilot valve 113 port 114 is connected by a port and passage 179 to a port and passage 180 which leads into the retention chamber. Port and passage 179 is connected by port 181 to a port 182 which also leads into the retention chamber. In this port is a restriction plug, and said port, beyond the restriction plug, is connected by a passage 183, said passage leading to a port 184 in the seat of the equalizing valve. The equalizing valve is formed with a port 185 which connects port 184 to port 151 and to the atmospheric port 152. Brake cylinder pressure may, therefore, flow through passage 115 and port 114 into the retention chamber through passages 180 and 182. This pressure may also flow out through passage 183 to the atmospheric port 152. The retention chamber is connected by a passage 186 to a port 187 in the seat of the release governing valve. In the graduated release position of the release governing valve port 187 is connected by cavity 171 to the port 172, this latter port being connected to the quick release chamber 174 by passage 173 so that the volume of the retention chamber 108 is augmented by the volume of the quick release chamber 174. In the passage 186 is a check valve 188, said check valve seating toward the retention chamber and being normally held from its seat by a light spring. This permits air to flow from the retention chamber to the quick release chamber 174 but prevents pressure flowing back to the retention chamber. Around the check valve is a by-pass passage in which is arranged a restriction plug having less capacity than the restriction plug in port 182. This permits the pressure trapped in chamber 174 to slowly blow down to atmosphere through the retention chamber while the pilot valve is in lap and service positions. The relative capacities of the restriction plugs prevent the accumulation of any pressure in the retention chamber while the pressure from chamber 174 is blowing down to atmosphere. In the emergency operation of the control valve the atmospheric port 152 will be closed, as will be hereinafter described and there will be no escape of air from the retention chamber through said port.

In the release position of the pilot valve air will flow from the equalizing chamber 107 through passage 122 into passage 115 and thence to atmosphere with the pressure from the brake cylinder. Pressure in chamber 107 will therefore be reduced with the brake cylinder pressure. When the pressure in chamber 107 has been reduced sufficiently to permit the undisturbed emergency reservoir pressure in chamber 48 to move the diaphragm structure and the pilot valve 113 upwardly to lap position, the flow of air from chamber 107 and from the brake cylinder will be stopped. The pressure in the actuating chamber 43 is increased a predetermined amount, by the increase in brake pipe pressure, as hereinbefore pointed out, and the pressure in chamber 107 must be reduced a predetermined ratio to the increase of pressure in chamber 43. As hereinbefore pointed out this ratio is approximately two-and-one-half to one so that an increase of five pounds in chamber 43 would require a reduction of pressure of approximately twelve-and-one-half pounds in chamber 107 and in the brake cylinder before the emergency reservoir pressure in chamber 48 can move the valve 113 to lap position. The pressure in chamber 45 will, of course, be reduced together with the brake cylinder pressure.

If it be desired to make a further reduction of brake cylinder pressure a further increase in brake pipe pressure will be made and the release operation will then be repeated, as hereinbefore described.

Pressure will continue to build up in the retention chamber 108 so long as the valve 113 is in release position, and the pressure in said chamber will exert an upward force on the diaphragm $f$ in opposition to the pressure in chamber 107. The amount of pressure which will flow into chamber 108 will depend upon the length of time the valve 113 is held in release position. The pressure in chamber 108 may flow out through passage 182 and the restriction plug and thence through passage 183 and the connected ports and passages to the atmospheric port 152. The pressure in chamber 108 will blow down to atmosphere if the pilot valve 113 is held in lap position for any considerable period. This pressure will also blow down to atmosphere if the pilot valve is held in release position a sufficient period to permit the brake cylinder pressure to blow down to atmosphere. The purpose of permitting air to flow into chamber 108 is to provide means for building up brake cylinder pressure higher than the predetermined two-and-one-half to one ratio during cycling operations. As is well known, "cycling" consists of rapidly alternating application and releases and is usually resorted to when the train is traveling down grade. If the cycling operations are slow with a considerable period between the application and release operations, the pressure in chamber 108 will blow down; and if the periods are long the pressure in chamber 108 will be reduced to atmospheric pressure. When, however, the cycling operations are rapid, as when the train is traveling down a heavy grade, pressure will be built up in chamber 108. The pressure remaining in chamber 108 when the valve 113 is moved to application position will make it necessary to build up a pressure in chamber 107 greater than the two-and-one-half to one ratio hereinbefore referred to, because the pressure in chamber 107 must now be great enough to overcome the upward force exerted on the diaphragm $f$ by the pressure in chamber 108. This will result in the build up of a higher brake cylinder pressure than would be possible if there were no pressure in chamber 108. The more rapid the cycling operations the greater the pressure retained in chamber 108 will be, and, therefore, the greater the pressure must be in chamber 107 in order to balance the increase in pressure in chamber 108. This, of course, results in a higher brake cylinder pressure.

The port 187 in the seat of the release governing valve is connected to an exhaust port 189 and said exhaust port is normally closed by a removable plug 190. When it is desired to operate the control valve in graduated release and without the pressure build up during the cycling operations, the plug 190 is removed. This provides a free exhaust of brake cylinder pressure through passage 186 and the connected ports and passages to the port 187 and thence to atmosphere through the port 189. There will, therefore, be no build up of pressure in the retention chamber 108, and the control valve will operate in graduated release without the pressure build up during cycling operations.

The release governing valve is formed with a port 191 which, in the graduated release position of said valve, registers with port 170. Port 191 is connected by a passage 192 to a port 193. This latter port registers with port 146. Passage 192 is connected by a port and passage 202, which in the graduated release position of the valve 134, registers with a port 203. Port 203 is connected by passage 204 to a port 205 which leads up into the main valve chamber and is in open communication therewith. Port 205 is connected directly to a port 206 in the seat of the main slide valve. In the service position of the main slide valve cavity 168 will connect port 206 to port 167 so that brake pipe air will flow from the main valve chamber through port 205 into port 167 and thence through passage 166 to the chamber 154, thereby preventing the opening of the quick release valve 158. When the main slide valve is moved to release position the cavity 168 will connect port 167 to port 169. Air will flow from port 205 through port 203, port and passage 202, port 193, port 146 and the connected ports and passages to port 126, and thence through the equalizing valve ports to passage 127 leading into the chamber 124$^a$ thereby holding the exhaust control valve closed. Air will also flow through passage 192, port 191, passage 170, cavity 168, port 167 and passage 166 into the chamber 154, thereby preventing the operation of the quick release valve mechanism.

Equalizing valve.

The equalizing valve mechanism J will remain inoperative, that is to say, will remain in its normal position so long as the brake pipe pressure in chamber 194 is higher than the brake cylinder pressure in chamber 196. The brake pipe pressure, as hereinbefore pointed out, enters chamber 194 from the main valve chamber through ports 39. A spring 207 arranged in chamber 194 assists the pressure in said chamber in holding the equalizing piston 195 against its normal stop. The normal position of the equalizing valve is shown in Figs. 1, 2 and 3. Its operated position is shown in Fig. 4. The equalizing valve mechanism remains inoperative except in emergency operations of the control valve and except when the brake cylinder pressure slightly exceeds the brake pipe pressure in the main valve chamber 1.

When the brake pipe pressure in the main valve chamber 1 has been reduced slightly below brake cylinder pressure in chamber 196 the pressure in said chamber 196 will force the equalizing piston inwardly closing ports 200. The equalizing valve 93 is moved on its seat to close port 198. This cuts off communication between the main valve chamber and the brake pipe and the equalizing valve chamber 199. As hereinbefore pointed out chamber 196 is connected to the brake cylinder pressure chamber 45 of the automatic emergency valve through passage 197 so that brake cylinder pressure is always present in chamber 196. The movement of the equalizing valve 93 uncovers a port 208, which port is connected by a passage 209 to the chamber 196 so that brake cylinder pressure may flow from said chamber into the equalizing valve chamber and thence through passage 201 to the release governing valve chamber 42. From chamber 42 air may flow through port 41 and passage 40 into the actuating chamber 43 of the pilot valve, so that the movement of the equalizing valve 93 places the brake cylinder in communication with chamber 42 of the release governing valve and the actuating chamber 43 of the pilot valve. The communication between the brake pipe and chambers 42 and 43 is closed. The movement of the equalizing valve brings cavity 102 into position to connect port 103 to port 92 and port 127$^a$ is uncovered. Brake cylinder pressure will flow through port 127$^a$ and passage 127 to chamber 124$^a$ and valve 125 will be held closed. By connecting port 103 to port 92 the service reservoir will be connected through passage 91, port 92, cavity 102, port 103 and passage 104, to the service port 105 of the pilot valve. The pilot valve will be in service position because of the emergency reservoir pressure in chamber 48 of the pilot valve structure. In the service position of the pilot valve the service reservoir will be connected to the brake cylinder so that any air in the service reservoir in excess of the brake cylinder pressure will be fed into the brake cylinder to compensate for leaks and to maintain brake cylinder pressure. Should the brake cylinder pressure in chamber 107 be high enough the pilot valve will be moved to service lap position. Upon a leak down of brake cylinder pressure the pilot valve will again be moved to service position to connect the service reservoir to the brake cylinder to compensate for leakage. When the pilot valve is in service position port 116 will be uncovered. However, as brake cylinder is at this time connected to chamber 43 and to the pilot valve chamber 111 there will be no flow of air from the pilot valve chamber through port 116 to the brake cylinder. In all other operations of the control valve, except emergency operation, brake pipe air will flow through port 116 to the brake cylinder when the pilot valve is in service position, as hereinbefore pointed out.

When the equalizing valve has been operated the continued reduction of brake pipe pressure will not affect the brake cylinder pressure, except of course, in the matter of bringing about an automatic emergency operation, as will be fully hereinafter described.

Emergency application.

An emergency operation of the control valve can be brought about only by a reduction of brake pipe pressure a predetermined degree below brake cylinder pressure. An emergency operation cannot be brought about until there is a certain degree of brake cylinder pressure above brake pipe pressure and this difference of pressures in the brake cylinder and brake pipe necessary to bring about an emergency application is dependent upon the relative proportions of the diaphragms *a* and *b* of the automatic emergency valve mechanism. The diaphragm *a* is slightly larger in effective area than the diaphragm *b*. The diaphragm *a* is at all times subject to brake pipe pressure in chamber 16 and the diaphragm *b* is at all times subject to brake cylinder pressure in chamber 45. The brake pipe pressure in chamber 16 holds the diaphragm structure in its upper position in all operations of the control valve, except emergency operation. In the chamber 45 is pivoted a lever 210, one end of which is pivotally connected to an upwardly extending stop stem 211 carried by the diaphragm *b*. The other end of the lever 210 is adapted to engage a pin 212 which extends upwardly through the passage 44 and is adapted to be brought into engagement with the emergency valve 46 and to lift said valve from its seat. When the brake cylinder pressure exceeds the brake pipe pressure to the required amount the diaphragms *a* and *b* are forced downwardly. Through the connection of the lever 210 the pin 212 will be forced upwardly and valve 46 will be lifted from its seat. This will place the emergency reservoir E in direct communication with the chamber 45 and as said chamber is in direct communication with the brake cylinder the emergency reservoir air will flow from said chamber to the brake cylinder. As hereinbefore pointed out the equalizing valve will be moved by the pressure in chamber 196, when said pressure is superior to the brake pipe pressure in the main valve chamber 1 and in chamber 194. The movement of the equalizing valve permits the high emergency brake cylinder pressure to equalize into chamber 124ª of the exhaust control valve, chamber 42 of the release governing valve, and chamber 43 of the pilot valve structure.

When the diaphragm structure of the automatic emergency valve is moved downwardly the lever 19 is moved away from the pin 21 and the valve 18 is closed. This prevents any further reduction of pressure in chamber 1. The control reservoir pressure will equalize into chamber 1, and the pressures on opposite sides of the quick release piston 153 will be maintained equalized. This will prevent the operation of the quick release plunger and the quick release valve 158. The brake cylinder pressure in chamber 71 of the regulating valve mechanism M will hold the regulating valve piston 69 in its lower or downward position. The pressure in chamber 38 of the automatic vent valve mechanism G will hold the vent valve 54 closed.

Release after emergency application.

A release after an emergency application is effected in the usual manner by increasing the brake pipe pressure. An increase in brake pipe pressure in chamber 14 will result in a corresponding increase of pressure in chamber 16 of the automatic emergency valve. When the pressure in chamber 16 has been raised sufficiently to move the diaphragm structure upwardly the valve 18 will be unseated and air may then flow from chamber 16 through passage 17 into the main valve chamber 1. The increase in pressure in chamber 1 will move the piston 2 and the main slide valve to release and charging position. The increase in pressure in chamber 1 will also flow into chamber 194 and force the equalizing valve back to its normal position. Air will then flow, as hereinbefore described, to the release governing valve chamber 42 and thence into the actuating chamber 43 of the pilot valve structure. The increase in pressure in chamber 43 will move the pilot valve to release position. The release of brake cylinder pressure will then take place as hereinbefore described and the reservoirs will be recharged.

What I claim is:

1. In an air brake apparatus, a brake pipe, a service reservoir, a control valve comprising a slide valve chamber, a slide valve therein, a piston connected to said valve, a pilot valve subject to brake pipe and brake cylinder pressures, an equalizing valve subject to brake pipe and brake cylinder pressures and controlling communication between the brake pipe and the brake pipe chamber of the pilot valve, means whereby the equalizing valve will be moved to close communication between the brake pipe and the brake pipe chamber of the pilot valve when the brake pipe and brake cylinder pressures are substantially equal, and means whereby the equalizing valve in its said moved position will connect the service reservoir to the service port of the pilot valve independently of the main slide valve.

2. In an air brake apparatus, a brake pipe, a service reservoir, a control valve comprising a slide valve chamber, a slide valve therein, a piston connected to said valve, a pilot valve subject to brake pipe and brake cylinder pressures, an equalizing valve subject to brake pipe and brake cylinder pressures and controlling communication between the brake pipe and the brake pipe chamber of the pilot valve, means whereby the equalizing valve will be moved to close communication between the brake pipe and the brake pipe chamber of the pilot valve when the brake pipe and brake cylinder pressures are substantially equal, means whereby the equalizing valve in its moved position will connect the service reservoir to the service port of the pilot valve independently of the main slide valve, and means whereby the equalizing valve in its moved position will close the brake cylinder pressure exhaust through the pilot valve.

3. In an air brake apparatus, a brake pipe, a service reservoir, a control valve comprising a slide valve chamber, a slide valve therein, a piston connected to said valve, a pilot valve subject to brake pipe and brake cylinder pressures, an equalizing valve subject to brake pipe and brake cylinder pressures and controlling communication between the brake pipe and the brake pipe chamber of the pilot valve, means whereby the equalizing valve will be moved to close communication between the brake pipe and the brake pipe chamber of the pilot valve when the brake pipe and brake cylinder pressures are substantially equal, means whereby the equalizing valve in its said moved position will connect the service reservoir to the service port of the pilot valve independently of the main slide valve, and means whereby the equalizing valve in its normal position will connect the service reservoir to the service port of the pilot valve through the slide valve when the said slide valve is in service position.

4. In an air brake apparatus, a brake pipe, a service reservoir, a control valve comprising a slide valve chamber, a slide valve therein, a piston connected to said valve, a pilot valve subject to brake pipe and brake cylinder pressures, an equalizing valve subject to brake pipe and brake cylinder pressures and controlling communication between the brake pipe and the brake pipe chamber of the pilot valve, means whereby the equalizing valve will be moved to close communication between the brake pipe and the brake pipe chamber of the pilot valve when the brake pipe and brake cylinder pressures are substantially equal, means whereby the equalizing valve in its said moved position will connect the service reservoir to the service port of the pilot valve independently of the main slide valve, means whereby the equalizing valve in its normal position will connect the service reservoir to the service port of the pilot valve through the slide valve when the said slide valve is in service position, a release governing valve having a quick release position and a graduated release position, and means whereby the release governing valve in its graduated release position will connect the service reservoir to the service port of the pilot valve independently of the main slide valve.

5. In an air brake apparatus, a brake pipe, a service reservoir, a control valve comprising a slide valve chamber, a slide valve therein, a piston connected to said valve, a pilot valve subject to brake pipe and brake cylinder pressures, an equalizing valve subject to brake pipe and brake cylinder pressures and controlling communication between the brake pipe and the brake pipe chamber of the pilot valve, means whereby the equalizing valve will be moved to close communication between the brake pipe and the brake pipe chamber of the pilot valve when the brake pipe and brake cylinder pressures are substantially equal, means whereby the equalizing valve in its said moved position will connect the service reservoir to the service port of the pilot valve independently of the main slide valve, means whereby the equalizing valve in its normal position will connect the service reservoir to the service port of the pilot valve through the slide valve when the said slide valve is in service position, a release governing valve having a quick release position and a graduated release position, and means whereby the release governing valve in its graduated release position will connect the service reservoir to the service port of the pilot valve independently of the main slide valve and of the equalizing valve.

6. In an air brake apparatus, a brake pipe, a service reservoir, a control reservoir, an emergency reservoir, a control valve comprising a main slide valve chamber, a main slide valve therein and having a service position and a service lap position, a main actuating piston connected to the main slide valve, a brake pipe connection with the main slide chamber, means for applying the control reservoir pressure to the outer side of the said main piston, a pilot valve subject to brake pipe, emergency reservoir and brake cylinder pressures, means adapted to operate when the slide valve is in service position and in service lap position to connect the service reservoir to the service port of the pilot valve, means whereby the pilot valve in service position will connect the service reservoir to the brake cylinder, means whereby the main slide valve in service position will connect the control reservoir to the main slide valve chamber, and an automatic emergency valve subject to brake pipe and brake cylinder pressure and adapted to be operated by brake cylinder pressure when the brake pipe pressure is below brake cylinder pressure to open communication between emergency reservoir and the brake cylinder.

7. In an air brake apparatus, a brake pipe, a service reservoir, a control reservoir, an emergency reservoir, a control valve comprising a main slide valve chamber, a main slide valve therein and having a service position and a service lap position, a main actuating piston connected to the main slide valve, a brake pipe connection with the main slide chamber, means for applying the control reservoir pressure to the outer side of the said main piston, a pilot valve subject to brake pipe, emergency reservoir and brake cylinder pressures, means adapted to operate when the slide valve is in service position and in service lap position to connect the service reservoir to the service port of the pilot valve, means whereby the pilot valve in service position will connect the service reservoir to the brake cylinder, means whereby the main slide valve in service position will connect the control reservoir to the main slide valve chamber, an automatic emergency valve subject to brake pipe and brake cylinder pressure and adapted to be operated by brake cylinder pressure when the brake pipe pressure is below brake cylinder pressure and open communication between emergency reservoir and the brake cylinder, and means whereby the automatic emergency valve mechanism will close communication between the main valve chamber and the brake pipe when the emergency reservoir is placed in communication with the brake cylinder.

8. In an air brake apparatus, a brake pipe, a service reservoir, an emergency reservoir, a main slide valve chamber, a main slide valve therein, means whereby the main slide valve will move to service position upon a reduction of brake pipe pressure, means operating upon a reduction of brake pipe pressure to connect the service reservoir to the brake cylinder when the main slide valve is in service position, an automatic emergency valve mechanism subject to brake cylinder and brake pipe pressures, and means adapted to be operated by said automatic emergency valve mechanism when the brake cylinder pressure exceeds brake pipe pressure to open communication between emergency reservoir and the brake cylinder.

9. In an air brake apparatus, a brake pipe, a service reservoir, an emergency reservoir, a main slide valve chamber, a main slide valve therein, means whereby the main slide valve will move to service position only upon a reduction of brake pipe pressure, means operating upon a reduction of brake pipe pressure to connect the service reservoir to the brake cylinder when the main slide valve is in service position, an automatic emergency valve mechanism subject to brake cylinder and brake pipe pressures, and means adapted to be operated by said automatic emergency valve mechanism when the brake cylinder pressure exceeds brake pipe pressure to open communication between emergency reservoir and the brake cylinder, and to close communication between the brake pipe and the main valve chamber.

10. In an air brake apparatus, a brake pipe, a service reservoir, an emergency reservoir, means operating upon a reduction of brake pipe pressure to place the service reservoir in communication with the brake cylinder for a service application of the brakes, and an automatic emergency valve mechanism subject to brake pipe and brake cylinder pressures and operating when the brake cylinder pressure exceeds the brake pipe pressure to open communication between the emergency reservoir and the brake cylinder.

11. In an air brake apparatus, a brake pipe, a service reservoir, an emergency reservoir, means operating upon a reduction of brake pipe pressure to place the service reservoir and the brake pipe in communication with the brake cylinder for a service application of the brakes, and an automatic emergency valve mechanism subject to brake pipe and brake cylinder pressure and operating when the brake cylinder pressure exceeds the brake pipe pressure to open communication between the emergency reservoir and the brake cylinder.

12. In an air brake apparatus, a brake pipe, a service reservoir, an emergency reservoir, means operating upon a reduction of brake pipe pressure to place the service reservoir in communication with the brake cylinder for a service application of the brakes, and an automatic emergency valve mechanism subject to brake pipe and brake cylinder pressures and operating when the brake cylinder pressure exceeds the brake pipe pressure a predetermined amount to open communication between the emergency reservoir and the brake cylinder.

13. In an air brake apparatus, a brake pipe, a service reservoir, an emergency reservoir, means operating to service position only upon a reduction of brake pipe pressure to place the service reservoir in communication with the brake cylinder for a service application of the brakes, and an automatic emergency valve mechanism subject to brake pipe and brake cylinder pressures and operating when the brake cylinder pressure exceeds the brake pipe pressure a predetermined amount to open communication between the emergency reservoir and the brake cylinder.

14. In an air brake apparatus, a brake pipe, a service reservoir, an emergency reservoir, means operating only to service position upon a reduction of brake pipe pressure to place the service reservoir and the brake pipe in communication with the brake cylinder for a service application of the brakes, and an automatic emergency valve mechanism subject to brake pipe and brake cylinder pressures and operating when the brake cylinder pressure exceeds the brake pipe pressure a predetermined amount to open communication between the emergency reservoir and the brake cylinder.

15. In an air brake apparatus, a brake pipe, a service reservoir, an emergency reservoir, means operating only to service position upon a reduction of brake pipe pressure to place the service reservoir in communication with the brake cylinder for a service application of the brakes, and an automatic emergency valve mechanism subject to brake pipe and brake cylinder pressures and operating when the brake cylinder pressure exceeds the brake pipe pressure to open communication between the emergency reservoir and the brake cylinder independently of the service application means.

16. In an air brake apparatus, a brake pipe, a service reservoir, an emergency reservoir, means operating only to service position upon a reduction of brake pipe pressure to place the service reservoir and the brake pipe in communication with the brake cylinder for a service application of the brakes, and an automatic emergency valve mechanism subject to brake pipe and brake cylinder pressures and operating when the brake cylinder pressure exceeds the brake pipe pressure a predetermined amount to open communication between the emergency reservoir and the brake cylinder independently of the service application means.

17. In an air brake apparatus, a brake pipe, a service reservoir, a control reservoir, an emergency reservoir, a control valve comprising a main slide valve chamber, a main slide valve therein and having a service position and a service lap position, a main actuating piston connected to the main slide valve, a brake pipe connection with the main slide chamber, means for applying the control reservoir pressure to the outer side of the said main piston, a pilot valve subject to brake pipe, emergency reservoir and brake cylinder pressures, means adapted to operate when the slide valve is in service position and in service lap position to connect the service reservoir to the service port of the pilot valve, means whereby the pilot valve in service position will connect the service reservoir to the brake cylinder, means whereby the main slide valve in service position will connect the control reservoir to the main slide valve chamber, and an automatic emergency valve subject to brake pipe and brake cylinder pressure and adapted to be operated by brake cylinder pressure when the brake pipe pressure is below brake cylinder pressure to open communication between emergency reservoir and the brake cylinder independently of the main slide valve and the pilot valve.

18. In an air brake apparatus, a brake pipe, a service reservoir, an emergency reservoir, a control valve comprising a main slide valve chamber, a main slide valve therein movable only to service position upon a reduction of brake pipe pressure, means whereby the main slide valve in service position will connect the service reservoir to the brake cylinder for a servcie application of the brakes, and an automatic emergency valve mechanism subject to brake pipe and brake cylinder pressures and operating when the brake cylinder pressure exceeds the brake pipe pressure a predetermined amount to open communication between the emergency reservoir and the brake cylinder independently of the means for securing a service application of the brakes.

19. In an air brake apparatus, a brake pipe, a service reservoir, an emergency reservoir, a control valve comprising a main slide valve chamber, a main slide valve therein movable only to service position upon a reduction of brake pipe pressure, a pilot valve subject to brake pipe, emergency reservoir and brake cylinder pressures, means adapted to operate when the slide valve is in service position to connect the service reservoir to the service port of the pilot valve, means whereby the pilot valve in service position will connect the service reservoir to the brake cylinder, and an automatic emergency valve mechanism subject to brake pipe and brake cylinder pressures and operating when the brake cylinder pressure exceeds the brake pipe pressure a predetermined amount to open communication between the emergency reservoir and the brake cylinder independently of the means for securing a service application of the brakes.

20. In an air brake apparatus, a brake pipe, a service reservoir, an emergency reservoir, a control valve comprising a main slide valve chamber, a main slide valve therein movable only to service position upon a reduction of brake pipe pressure, means whereby the main slide valve in service position will connect the service reservoir to the brake cylinder for a service application of the brakes, and an automatic emergency valve mechanism comprising a pair of diaphragms of different areas, one of said diaphragms being subject to brake cylinder pressure and the other being subject to brake pipe pressure, said diaphragms being movable in one direction by brake pipe pressure and in the opposite direction by brake cylinder pressure, means adapted to be operated when the diaphragms are moved in one direction by the brake pipe pressure to open communication between the brake pipe and the main valve chamber and to close communication between the emergency reservoir and the brake cylinder, said means operating when the diaphragms are moved in the opposite direction by brake cylinder pressure to open communication between the emergency reservoir and the brake cylinder independently of the main slide valve and to close communication between the brake pipe and the main slide valve chamber.

21. In an air brake apparatus, a brake pipe, a service reservoir, an emergency reservoir, a control valve comprising a main slide valve chamber, a main slide valve therein and movable to service position upon a reduction of brake pipe pressure, a pilot valve subject to brake pipe, emergency reservoir and brake cylinder pressures, means adapted to operate when the slide valve is in service position to connect the service reservoir to the service port of the pilot valve, means whereby the pilot valve in service position will connect the service reservoir to the brake cylinder, means whereby the pilot valve in release position will connect the brake cylinder to atmosphere, an automatic emergency valve subject to brake pipe and brake cylinder pressure and adapted to be operated by brake cylinder pressure when the brake pipe pressure is below brake cylinder pressure to open communication between emergency reservoir and the brake cylinder independently of the main slide valve and the pilot valve, and an equalizing valve subject to brake pipe and brake cylinder pressures and operable in emergency applications to connect the service reservoir to the service port of the pilot valve independently of the main slide valve and to close the brake cylinder exhaust through the pilot valve.

22. A control valve for air brake apparatus comprising means operable upon a reduction of brake pipe pressure to admit air to the brake cylinder for an application of the brakes, and an automatic brake pipe vent valve operable by brake pipe pressure to connect the brake pipe to the brake cylinder to permit brake pipe air to flow to the brake cylinder until there has been a predetermined reduction of brake pipe pressure.

23. A control valve for air brake apparatus comprising an application valve mechanism operable upon a reduction of brake pipe pressure to admit air to the brake cylinder for and application of the brakes, and an automatic brake pipe vent valve mechanism operable by brake pipe pressure to connect the brake pipe to the brake cylinder to permit brake pipe air to flow to the brake cylinder independently of the said application valve mechanism until there has been a predetermined reduction of brake pipe pressure.

24. A control valve for an air brake apparatus comprising a main slide valve movable to application position upon a reduction of brake pipe pressure, a pilot valve movable to application position upon a reduction of brake pipe pressure, means whereby the main slide valve and the pilot valve when in application position will admit air to the brake cylinder for an application of the brakes, and an automatic brake pipe vent valve mechanism operable by brake pipe pressure to connect the brake pipe to the brake cylinder to permit brake pipe air to flow to the brake cylinder independently of the main slide valve and of the pilot valve until there has been a predetermined reduction of brake pipe pressure.

25. A control valve for air brake apparatus comprising an application valve mechanism operable upon a reduction of brake pipe pressure to admit air to the brake cylinder for an application of the brakes, an automatic brake pipe vent valve mechanism operable by brake pipe pressure to connect the brake pipe to the brake cylinder to permit brake pipe air to flow to the brake cylinder independently of the said application valve mechanism until there has been a predetermined reduction of brake pipe pressure, an intercepting valve interposed between the brake pipe vent valve and the brake cylinder and normally closed by brake pipe pressure, means whereby the application valve mechanism in application position will open said intercepting valve to permit air to flow from the brake pipe vent valve to the brake cylinder, and means operable by brake cylinder pressure to permit brake pipe pressure to close said intercepting valve.

26. A control valve for an air brake apparatus comprising a main slide valve movable to application position upon a reduction of brake pipe pressure, a pilot valve movable to application position upon a reduction of brake pipe pressure, means whereby the main slide valve and the pilot valve when in application position will admit air to the brake cylinder for an application of the brakes, an automatic brake pipe vent valve mechanism operable by brake pipe pressure to connect the brake pipe to the brake cylinder to permit brake pipe air to flow to the brake cylinder independently of the main slide valve and of the pilot valve until there has been a predetermined reduction of brake pipe pressure, an intercepting valve interposed between the brake pipe vent valve and the brake cylinder and normally closed by brake pipe pressure, means whereby the main slide valve in application position will open said intercepting valve to permit air to flow from the brake pipe vent valve to the brake cylinder, and means operable by brake cylinder pressure to permit brake pipe pressure to close the said intercepting valve.

27. A control valve for an air brake apparatus comprising a main slide valve movable to application position upon a reduction of brake pipe pressure, a pilot valve movable to application position upon a reduction of brake pipe pressure, means whereby the main slide valve and the pilot valve when in application position will admit air to the brake cylinder for an application of the brakes, an automatic brake pipe vent valve mechanism operable by brake pipe pressure to connect the brake pipe to the brake cylinder to permit brake pipe air to flow to the brake cylinder independently of the main slide valve and of the pilot valve until there has been a predetermined reduction of brake pipe pressure, an intercepting valve interposed between the brake pipe vent valve and the brake cylinder and normally closed by brake pipe pressure, means whereby the main slide valve in application position will open said intercepting valve to permit air to flow from the brake pipe vent valve to the brake cylinder, and a regulating valve mechanism operable by brake cylinder pressure to admit brake pipe air to close the intercepting valve, said regulating valve when moved by brake cylinder pressure connecting the brake pipe to the brake cylinder when the pilot valve is in service position.

28. A control valve for an air brake apparatus comprising a main slide valve movable to application position upon a reduction of brake pipe pressure, a pilot valve movable to application position upon a reduction of brake pipe pressure, means whereby the main slide valve and the pilot valve when in application position will admit air to the brake cylinder for an application of the brakes, an automatic brake pipe vent valve mechanism comprising a pair of parallel diaphragms of unequal areas, means for subjecting the larger diaphragm to the pressure of the brake pipe, means for subjecting the smaller diaphragm to trapped brake pipe pressure when the main slide valve is in application position, a valve carried by the larger diaphragm and normally opening a brake pipe vent port, an intercepting valve interposed between the brake pipe vent valve and the brake cylinder and normally closed by brake pipe pressure to prevent the flow of air from the vent valve to the brake cylinder, means whereby the main slide valve in application position will open said intercepting valve to permit air to flow from the vent valve to the brake cylinder, the trapped brake pipe air moving the diaphragms to close the vent valve when there has been a predetermined reduction of brake pipe pressure, and means operable by brake cylinder pressure to permit brake pipe pressure to close the said intercepting valve.

29. A control valve for an air brake apparatus comprising a main slide valve movable to application position upon a reduction of brake pipe pressure and movable to release position upon an increase of brake pipe pressure, an exhaust control valve mechanism, means whereby the main slide valve in application position will admit air to the exhaust control valve mechanism to close said valve, and means whereby the main slide valve in release position will exhaust air from the exhaust control valve mechanism to permit said valve to open for the release of brake cylinder pressure.

30. A control valve for an air brake apparatus comprising a main slide valve movable to application position upon a reduction of brake pipe pressure and movable to release position upon an increase of brake pipe pressure, an exhaust control valve mechanism, means whereby the main slide valve in application position will admit air to the exhaust control valve mechanism to close said valve, means whereby the main slide valve in release position will exhaust air from the exhaust control valve to permit said valve to open for the release of brake cylinder pressure, means whereby an excessive brake pipe pressure will move the main slide valve to restricted release position, means whereby the main slide valve in restricted release position will admit air to the exhaust control valve mechanism to close said valve, and means operated by an increase of brake pipe pressure to slowly release brake cylinder pressure independently of the exhaust control valve.

31. A control valve for an air brake apparatus comprising a main slide valve movable to application position upon a reduction of brake pipe pressure and movable to release position upon an increase of brake pipe pressure, an exhaust control valve mechanism, means whereby the main slide valve in application position will admit air to the exhaust control valve mechanism to close said valve, means whereby the main slide valve in release position will exhaust air from the exhaust control valve to permit said valve to open for the release of brake cylinder pressure, means whereby an excessive brake pipe pressure will move the main slide valve to restricted release position, means whereby the main slide valve in restricted release position will admit air to the exhaust control valve mechanism to close said valve, means operated by an increase of brake pipe pressure to slowly release brake cylinder pressure independently of the exhaust control valve, a manually operable release governing valve mechanism having a graduated release position and a quick release position, means whereby the release governing valve in quick release position will permit brake cylinder pressure to exhaust through the exhaust control valve when said valve is in release position, and means whereby the release governing valve in graduated release position will prevent the flow of brake cylinder pressure to the exhaust control valve.

32. In an air brake apparatus, a brake pipe, a service reservoir, an emergency reservoir, a control valve comprising a main slide valve chamber, a main slide valve therein and having a service position, a main actuating piston connected to the main slide valve, a pilot valve subject to brake pipe, emergency reservoir and brake cylinder pressures, means adapted to operate when the slide valve is in service position to connect the service reservoir to the service port of the pilot valve, means whereby the pilot valve in service position will connect the service reservoir to the brake cylinder, means whereby the pilot valve in release position will connect the brake cylinder to atmosphere independently of the exhaust control valve, the main slide valve and the pilot valve moving to application position upon a reduction of brake pipe pressure and moving to release position upon an increase of brake pipe pressure, an exhaust control valve mechanism, means whereby the main slide valve in application position will admit air to the exhaust control valve mechanism to close said valve, means whereby the main slide valve in release position will exhaust air from the exhaust control valve to permit said valve to open for the release of brake cylinder pressure, a manually operable release governing valve mechanism having a graduated release position and a quick release position, means whereby the release governing valve in quick release position will permit brake cylinder pressure to exhaust through the exhaust control valve when said valve is in release position, and means whereby the release governing valve in graduated release position will prevent the flow of brake cylinder pressure to the exhaust control valve.

33. A control valve for an air brake apparatus comprising a main slide valve chamber, a main slide valve therein, an actuating piston connected to said slide valve, means for establishing brake pipe pressure on one side of said actuating piston, a control reservoir, means for establishing control reservoir pressure on the other side of said piston, said slide valve moving only to service application position regardless of the rate or extent of the brake pipe pressure reduction and will be moved to release position upon an increase of brake pipe pressure, means whereby the main slide valve in service position will permit the control reservoir to equalize on opposite sides of the actuating piston, a spring-pressed service stop adapted to yield to permit the main slide valve to move to application position said yieldable stop moving the slide valve back to service lap position when the control reservoir has equalized on opposite sides of the actuating piston, a yieldable normal release stop adapted to arrest the main slide valve in normal release position and yielding under an excessive brake pipe pressure to permit the main slide valve to move into restricted release and retarded recharging position, said yieldable stop moving the slide valve back to normal charging position upon an equalization of pressures on opposite sides of the actuating piston, and means whereby the main slide valve in service position will permit air to flow to the brake cylinder for an application of the brakes.

34. In an air brake apparatus, a brake pipe, a service reservoir, an emergency reservoir, a service application valve mechanism movable to application position upon a reduction of brake pipe pressure and operable only to place the service reservoir in communication with the brake cylinder for a service application of the brakes and ineffective to connect the emergency reservoir to the brake cylinder, and an automatic emergency valve mechanism subject to brake pipe and brake cylinder pressures and operating when the brake cylinder pressure exceeds the brake pipe pressure to open communication between the emergency reservoir and the brake cylinder independently of the service valve mechanism.

35. In an air brake apparatus a brake pipe, a service reservoir, an emergency reservoir, a service application valve mechanism movable to application position upon a reduction of brake pipe pressure and operable only to place the service reservoir and the brake pipe in communication with the brake cylinder for a service application of the brakes and ineffective to connect the emergency reservoir to the brake cylinder, and an automatic emergency valve mechanism subject to brake pipe and brake cylinder pressures and operating when the brake cylinder pressure exceeds the brake pipe pressure to open communication between the emergency reservoir and the brake cylinder independently of the service valve mechanism.

36. In an air brake apparatus a brake pipe, a service reservoir, an emergency reservoir, a service application valve mechanism movable to application position upon a reduction of brake pipe pressure and operable only to place the service reservoir in communication with the brake cylinder for a service application of the brakes and ineffective to connect the emergency reservoir to the brake cylinder, and an automatic emergency valve mechanism operating when the brake cylinder pressure exceeds the brake pipe pressure to open communication between the emergency reservoir and the brake cylinder.

37. In an air brake apparatus a brake pipe, a service reservoir, an emergency reservoir, a service application valve mechanism movable to application position upon a reduction of brake pipe pressure and operable only to place the service reservoir and the brake pipe in communication with the brake cylinder for a service application of the brakes and ineffective to connect the emergency reservoir to the brake cylinder, and an automatic emergency valve mechanism operating when the brake cylinder pressure exceeds the brake pipe pressure to open communication between the emergency reservoir and the brake cylinder independently of the service valve mechanism.

38. A control valve for an air brake apparatus, comprising a service application valve mechanism movable to application position upon a reduction of brake pipe pressure and operable only to place a service reservoir in communication with the brake cylinder for a service application of the brakes and ineffective to connect an emergency reservoir to the brake cylinder, and an automatic emergency valve mechanism operating when the brake cylinder pressure exceeds the brake pipe pressure to open communication between an emergency reservoir and the brake cylinder.

39. A control valve for an air brake apparatus, comprising a service application valve mechanism movable to application position upon a reduction of brake pipe pressure and operable only to place a service reservoir and a brake pipe in communication with the brake cylinder for a service application of the brakes and ineffective to connect an emergency reservoir to the brake cylinder, and an automatic emergency valve mechanism operating when the brake cylinder pressure exceeds the brake pipe pressure a predetermined amount to open communication between an emergency reservoir and the brake cylinder independently of the service application valve mechanism.

40. A control valve for an air brake apparatus, comprising a service application valve mechanism movable to application position upon a reduction of brake pipe pressure and operable only to place a service reservoir in communication with the brake cylinder for a service application of the brakes and ineffective to connect an emergency reservoir to the brake cylinder, and an automatic emergency valve mechanism operating when the brake cylinder pressure reaches a predetermined pressure relation to the brake pipe pressure to open communication between an emergency reservoir and the brake cylinder.

41. In an air brake apparatus, a brake pipe, a service reservoir, an emergency reservoir, a main slide valve chamber, a main slide valve therein, means whereby the main slide valve will move to service position upon a reduction of brake pipe pressure to connect the service reservoir to the brake cylinder when the main slide valve is in service position the main slide valve and the service application valve being operable only to place the service reservoir in communication with the brake cylinder for a service application of the brakes and ineffective to connect the emergency reservoir to the brake cylinder, an automatic emergency valve mechanism, and means adapted to be operated by said automatic emergency valve mechanism when the brake cylinder pressure exceeds brake pipe pressure to open communication between emergency reservoir and the brake cylinder.

42. A control valve for an air brake apparatus, comprising a main slide valve, means whereby the main slide valve will move to service position upon a reduction of brake pipe pressure, means operating upon a reduction of brake pipe pressure to connect a service reservoir to the brake cylinder when the main slide valve is in service position, an automatic emergency valve mechanism subject to brake cylinder and brake pipe pressures, and means adapted to be operated by said automatic emergency valve mechanism when the brake cylinder pressure exceeds brake pipe pressure to open communication between emergency reservoir and the brake cylinder.

43. A control valve for an air brake apparatus, comprising a main slide valve movable to application position upon a reduction of brake pipe pressure and movable to release position upon an increase of brake pipe pressure, an exhaust control valve mechanism, means whereby the main slide valve in application position will admit brake pipe air to the exhaust control valve mechanism to close said valve, and means whereby the main slide valve in release position will exhaust air from the exhaust control valve mechanism to permit said valve to be moved by brake pipe air to open position for the release of brake cylinder pressure.

44. A control valve for an air brake apparatus, comprising a main slide valve movable to application position upon a reduction of brake pipe pressure and movable to release position upon an increase of brake pipe pressure, an exhaust control slide valve, a piston connected thereto and subject on one side to brake pipe pressure at all times and tending to move said valve to open position, a spring opposing said brake pipe pressure and tending to move the said valve to closed position, means whereby the main slide valve in application position will admit air to one side of the piston of the exhaust control valve mechanism to close said valve, and means whereby the main slide valve in release position will exhaust air from one side of the piston of the exhaust control valve mechanism to permit said valve to open for the release of brake cylinder pressure.

45. A control valve for an air brake apparatus, comprising a service application valve mechanism movable to application position upon a reduction of brake pipe pressure, an automatic brake pipe vent valve mechanism operable by brake pipe pressure to connect the brake pipe to the brake cylinder to permit brake pipe air to flow to the brake cylinder independently of the service application valve mechanism, means whereby the service application valve mechanism in service position will connect the brake pipe to the brake cylinder, and means interposed between the service valve mechanism and the brake cylinder and operable by brake cylinder pressure to open position to thereby permit brake pipe air to flow from the service application valve mechanism to the brake cylinder.

46. A control valve for an air brake apparatus, comprising a service application valve mechanism movable to application position upon a reduction of brake pipe pressure, an automatic brake pipe vent valve mechanism operable by brake pipe pressure to connect the brake pipe to the brake cylinder to permit brake pipe air to flow to the brake cylinder independently of the service application valve mechanism until there has been a predetermined reduction of brake pipe pressure, means whereby the service application valve mechanism in service position will connect the brake pipe to the brake cylinder and means interposed between the service valve mechanism and the brake cylinder to prevent the flow of brake pipe air from the service application valve mechanism to the brake cylinder while the vent valve is open and operable by brake cylinder pressure to open position to thereby permit brake pipe air to flow from the service application valve mechanism to the brake cylinder.

47. In an air brake apparatus, a brake pipe, a service reservoir, a control reservoir, an emergency reservoir, a control valve comprising a main slide valve chamber, a main slide valve therein and having a service position and a service lap position, a main actuating piston connected to the main slide valve, a brake pipe connection with the main slide valve chamber, means for applying the control reservoir pressure to the outer side of the said main piston, a pilot valve subject to brake pipe emergency reservoir and brake cylinder pressures, means adapted to operate when the slide valve is in service position and in service lap position to connect the service reservoir to the service port of the pilot valve, means whereby the pilot valve in service position will connect the service reservoir to the brake cylinder, means whereby the main slide valve in service position will connect the control reservoir to the main slide valve chamber, and an automatic emergency valve operating when the brake pipe pressure is below brake cylinder pressure to open communication between the emergency reservoir and the brake cylinder.

In testimony whereof I hereunto affix my signature.

WILLIAM ASTLE.